(12) United States Patent
Kowalevicz et al.

(10) Patent No.: US 11,929,783 B2
(45) Date of Patent: Mar. 12, 2024

(54) MONOSTATIC OPTICAL TERMINAL SUPPORTING MULTIPLE INDEPENDENT TRANSMIT AND RECEIVE CHANNELS

(71) Applicant: Raytheon Company, Waltham, MA (US)

(72) Inventors: Andrew M. Kowalevicz, Arlington, VA (US); Jae H. Kyung, Redondo Beach, CA (US)

(73) Assignee: Raytheon Company, Tewksbury, MA (US)

( * ) Notice: Subject to any disclaimer, the term of this patent is extended or adjusted under 35 U.S.C. 154(b) by 82 days.

(21) Appl. No.: 17/643,136

(22) Filed: Dec. 7, 2021

(65) Prior Publication Data

US 2023/0179298 A1 Jun. 8, 2023

(51) Int. Cl.
*H04B 10/112* (2013.01)
*H04B 10/532* (2013.01)

(52) U.S. Cl.
CPC ....... *H04B 10/1127* (2013.01); *H04B 10/532* (2013.01)

(58) Field of Classification Search
CPC .......................... H04B 10/1127; H04B 10/532
See application file for complete search history.

(56) References Cited

U.S. PATENT DOCUMENTS

| | | |
|---|---|---|
| 5,726,801 A | 3/1998 | Pan |
| 6,249,619 B1 | 6/2001 | Bergmann et al. |
| 6,977,763 B1 | 12/2005 | Wang et al. |
| 9,755,739 B1 * | 9/2017 | Wang ................... H04B 10/118 |
| 10,215,936 B2 | 2/2019 | Graves et al. |
| 10,298,325 B1 * | 5/2019 | Birnbaum .............. H04B 10/40 |
| 10,763,961 B2 | 9/2020 | Newell et al. |
| 10,908,358 B1 | 2/2021 | Bock et al. |

(Continued)

FOREIGN PATENT DOCUMENTS

RU 2638095 C1 12/2017

OTHER PUBLICATIONS

Čierny et al., "Beaconless pointing and tracking for bidirectional optical links using MEMS mirror nutation," Proc. SPIE 11678, Free-Space Laser Communications XXXIII, Mar. 2021, 12 pages.

(Continued)

*Primary Examiner* — Mina M Shalaby

(57) ABSTRACT

A method includes providing outgoing optical signals for transmission by a monostatic optical terminal using multiple transmit channels and providing incoming optical signals obtained by the monostatic optical terminal to multiple receive channels. The method also includes using a polarization beam splitter/combiner to combine the outgoing optical signals into a combined outgoing optical signal and to split a combined incoming optical signal into the incoming optical signals. The method further includes using at least one feedback loop to adjust an aim or path of at least one of the outgoing optical signals or at least one of the incoming optical signals. The method may optionally include using an optical element to convert polarizations of the combined outgoing optical signal in order to generate an output signal and to convert polarizations of an input signal in order to generate the combined incoming optical signal.

20 Claims, 3 Drawing Sheets

(56) References Cited

U.S. PATENT DOCUMENTS

| | | | |
|---|---|---|---|
| 11,121,518 B1* | 9/2021 | Wroblewski | G02B 7/008 |
| 2007/0031151 A1* | 2/2007 | Cunningham | H04B 10/1127 |
| | | | 398/131 |
| 2012/0154783 A1 | 6/2012 | Goldberg et al. | |
| 2016/0112124 A1* | 4/2016 | Juarez | H04B 10/112 |
| | | | 398/118 |
| 2016/0294472 A1* | 10/2016 | Palmer | H04B 7/0617 |
| 2019/0044606 A1* | 2/2019 | Mansikkamäki | H04B 7/15507 |
| 2023/0091416 A1* | 3/2023 | Fujita | H04Q 11/0005 |

OTHER PUBLICATIONS

Al-Gailani et al., "A Survey of Free Space Optics (FSO) Communication Systems, Links, and Networks," IEEE Access, vol. 9, Dec. 2020, 21 pages.

FOSCO, "Fiber Optic Circulators," blog, fiberoptics4sale.com, May 2016, 16 pages.

Bohata et al., "Characterization of dual-polarization LTE radio over a free-space optical turbulence channel," Research Article, Applied Optics, vol. 54, No. 29, 2015, 7 pages.

Abari et al., "A reconfigurable all-fiber polarization-diversity coherent Doppler lidar: principles and numerical simulations," Research Article, Applied Optics, vol. 54, No. 30, Oct. 2015, 11 pages.

Nawaz et al., "A Compact, Bistatic Antenna System with Very High Interport Isolation for 2.4 GHZ In-Band Full Duplex Applications," Research Article, Hindawi, International Journal of Antennas and Propagation, vol. 2021, Article ID 8855726, 2021, 8 pages.

International Search Report and Written Opinion of the International Searching Authority dated Jan. 9, 2023 in connection with International Patent Application No. PCT/US2022/076954, 10 pages.

\* cited by examiner

US 11,929,783 B2

MONOSTATIC OPTICAL TERMINAL SUPPORTING MULTIPLE INDEPENDENT TRANSMIT AND RECEIVE CHANNELS

TECHNICAL FIELD

This disclosure relates generally to optical systems. More specifically, this disclosure relates to a monostatic optical terminal supporting multiple independent transmit and receive channels.

BACKGROUND

Free-space optical communication (FSOC) systems generally include multiple optical terminals that communicate with one another by transmitting and receiving optical signals through free space (rather than through fiber optic cables or other physical cables). Depending on the application, these optical terminals typically have either a monostatic design or a bi-static design. In a monostatic design, an optical terminal uses a single aperture for both transmitting and receiving optical signals to and from another optical terminal. In a bi-static design, an optical terminal uses separate dedicated apertures for transmitting and receiving optical signals to and from another optical terminal.

SUMMARY

This disclosure relates to a monostatic optical terminal supporting multiple independent transmit and receive channels.

In a first embodiment, an apparatus includes a monostatic optical terminal configured to transmit and receive optical signals over multiple optical channels through an aperture. The monostatic optical terminal includes multiple transmit channels configured to provide outgoing optical signals for transmission by the monostatic optical terminal and multiple receive channels configured to receive incoming optical signals obtained by the monostatic optical terminal. The monostatic optical terminal also includes a polarization beam splitter/combiner configured to combine the outgoing optical signals into a combined outgoing optical signal and to split a combined incoming optical signal into the incoming optical signals. The monostatic optical terminal further includes at least one feedback loop configured to adjust an aim or path of at least one of the outgoing optical signals or at least one of the incoming optical signals.

In a second embodiment, a method includes providing outgoing optical signals for transmission by a monostatic optical terminal using multiple transmit channels and providing incoming optical signals obtained by the monostatic optical terminal to multiple receive channels. The method also includes using a polarization beam splitter/combiner to combine the outgoing optical signals into a combined outgoing optical signal and to split a combined incoming optical signal into the incoming optical signals. The method further includes using at least one feedback loop to adjust an aim or path of at least one of the outgoing optical signals or at least one of the incoming optical signals.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
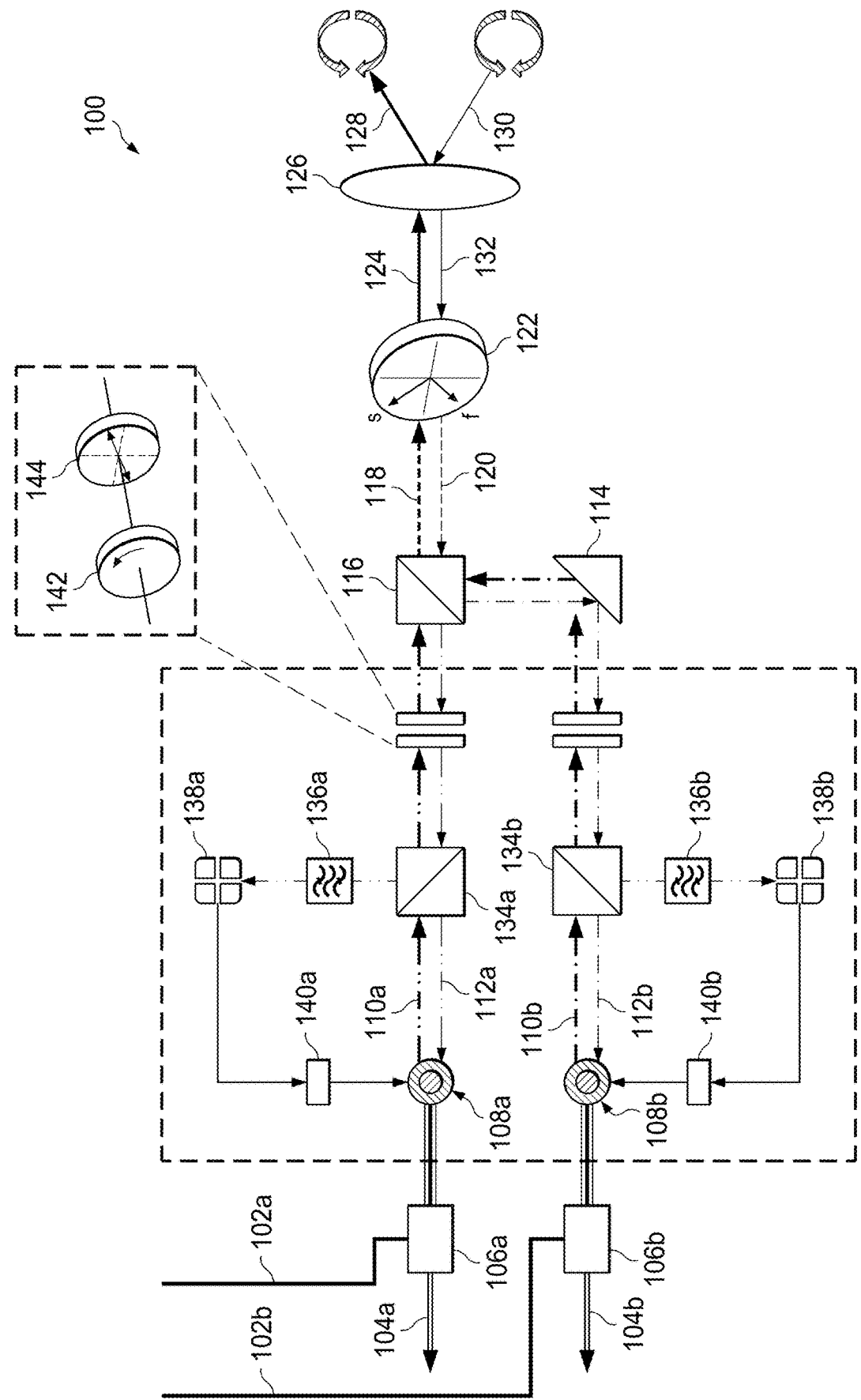
FIG. 1 illustrates a first example monostatic optical terminal supporting multiple independent transmit and receive channels according to this disclosure.
Figure 2:
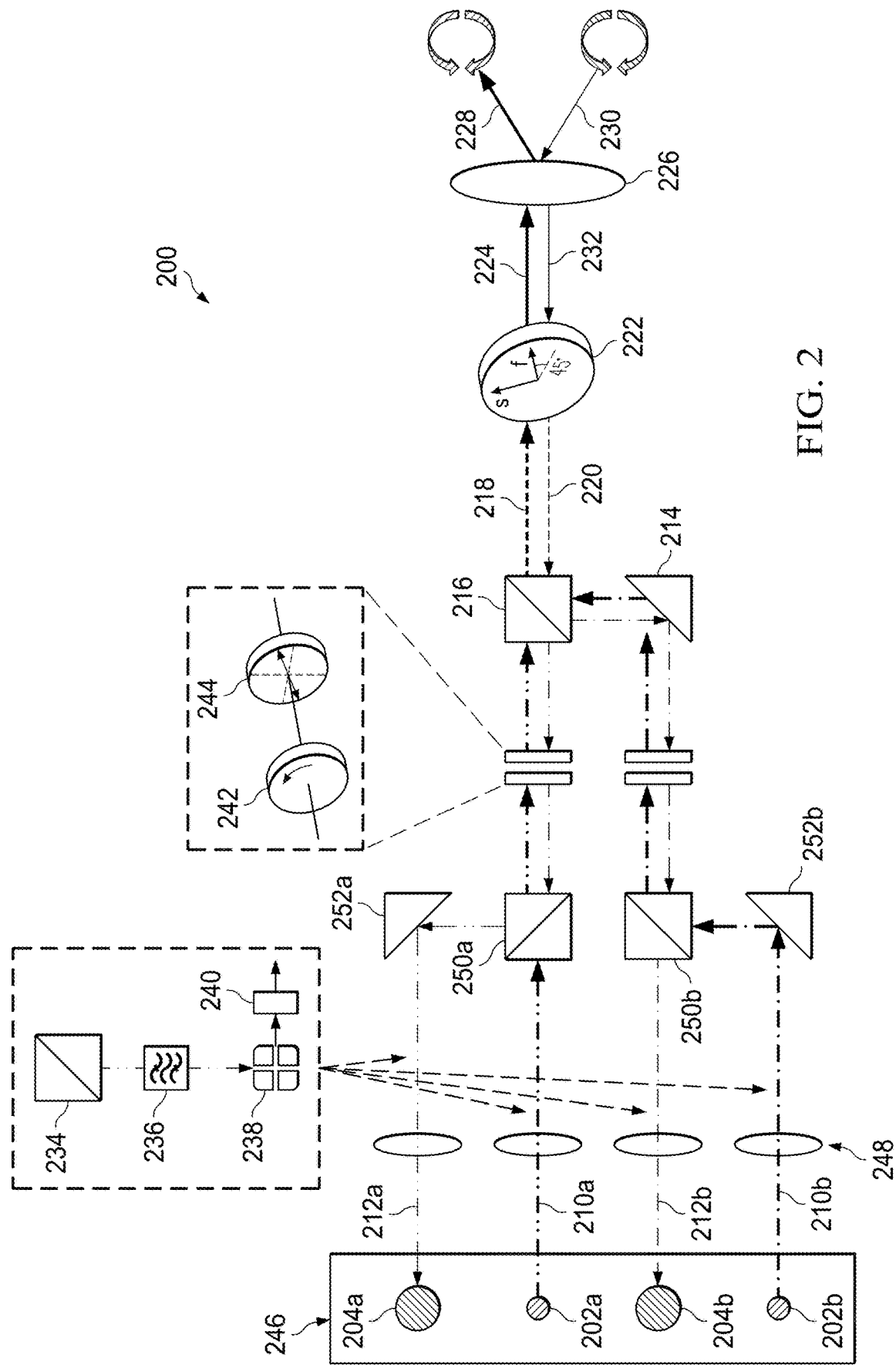
FIG. 2 illustrates a second example monostatic optical terminal supporting multiple independent transmit and receive channels according to this disclosure.
Figure 3:
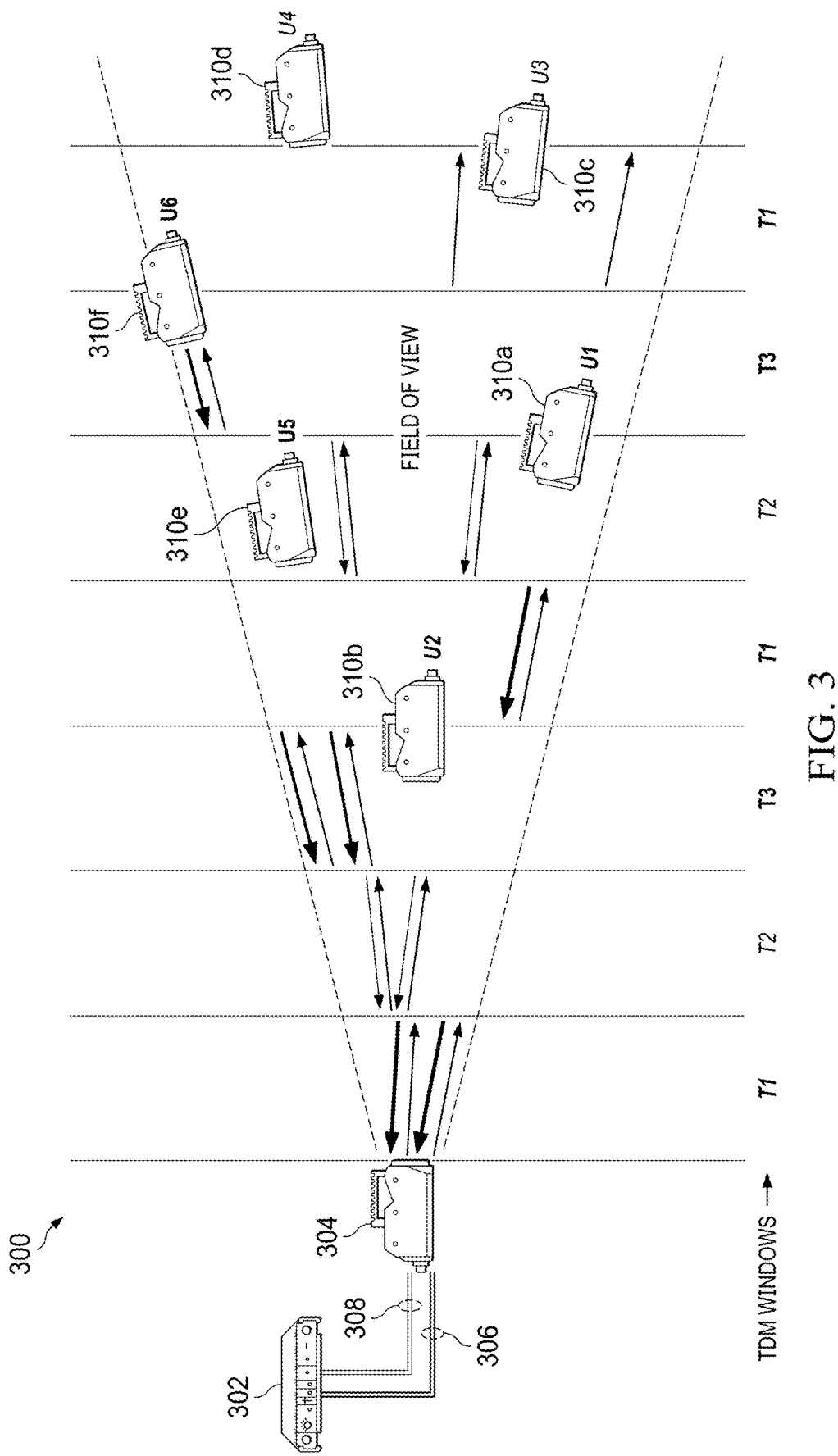
FIG. 3 illustrates an example system using a monostatic optical terminal supporting multiple independent transmit and receive channels according to this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, free-space optical communication (FSOC) systems generally include multiple optical terminals that communicate with one another by transmitting and receiving optical signals through free space (rather than through fiber optic cables or other physical cables). Depending on the application, these optical terminals typically have either a monostatic design or a bi-static design. In a monostatic design, an optical terminal uses a single aperture for both transmitting and receiving optical signals to and from another optical terminal. In a bi-static design, an optical terminal uses separate dedicated apertures for transmitting and receiving optical signals to and from another optical terminal. Unfortunately, while these designs allow for effective optical communications by an optical terminal with another optical terminal, communications with more than one other optical terminal may require duplication of the single aperture in the monostatic design or duplication of the dedicated apertures in the bi-static design. This is inefficient and increases the size, weight, power, and cost (SWaP-C) of the optical terminal.

This disclosure provides various monostatic optical terminals supporting multiple independent transmit and receive channels. As described in more detail below, each monostatic optical terminal includes a single aperture through which both transmissions and receptions of optical signals can occur. Moreover, each monostatic optical terminal has the ability to communicate with (or otherwise transmit optical signals to and receive optical signals from) multiple other optical terminals or other objects through the same single aperture. Interactions with the other optical terminals or other objects can occur in a non-interfering manner, such as through the use of time division multiplexing (TDM), wavelength division multiplexing (WDM), or other suitable multiplexing/demultiplexing technique. In some cases, each monostatic optical terminal can permit an offset between the transmit and receive angles on the same optical channel. This may be useful, for instance, in applications where "look-ahead" capabilities are used in order to send information to where another terminal will be while receiving information from where the other terminal had been, such as in applications with large separations between communicating parties or in applications where the relative velocity between communicating terminals is large. Also, in some cases, the monostatic optical terminals may be designed to support various modes of operation as needed or desired, such as when the monostatic optical terminals can be configured to operate as link relays or link repeaters (meaning the monostatic optical terminals may receive an incoming signal from one external device or system and retransmit the signal as an outgoing signal to another external device or system).

In this way, the disclosed optical terminals can support communications or other interactions over larger numbers of independent optical channels, which (among other things) may enable higher-capacity free-space optical communications to occur using low SWaP-C monostatic designs or packages. In some cases, the cost of the monostatic optical terminals can be reduced while maintaining the performance of the monostatic optical terminals compared to designs that replicate apertures to enable interactions over multiple channels. Also, the monostatic optical terminals may be used to flexibly support communications or other interactions involving single-wavelength single-polarization designs or dual-polarization designs, which can be useful in various applications. In some embodiments, the monostatic optical terminals can be rotationally insensitive, which means that the monostatic optical terminals can effectively communicate or otherwise operate regardless of the rotations of the optical terminals with respect to each other or other objects. Further, unlike other approaches that require using different portions of sensor devices to support transmit and receive operations through the same aperture, the monostatic optical terminals here may experience no degradation in performance or efficiency when communicating with different external terminals or otherwise interacting with different external objects using the same aperture. In addition, the monostatic optical terminals may provide for separate control of transmit and receive beams in each independent channel, which allows for functions such as look-ahead or independent channel control. This may be necessary or desirable in various applications, such as those involving larger offsets between devices or larger relative velocities between terminals or those involving turbulent environments.

Note that while the various monostatic optical terminals described in this patent document are often described as being used to support optical communications, the monostatic optical terminals may be used for any other suitable purposes, such as in any suitable application that involves the transmission and reception of one or more optical signals. For example, in other use cases, the monostatic optical terminals may be used to support light detection and ranging (LIDAR) functionality or range-finding functionality. Also note that the monostatic optical terminals may be used in any number of potential applications. Example applications may include ground-to-space free-space optical communications, ground-based free-space optical communications, space-based free-space optical communications (like optical intersatellite link or "OISL" communications), point-to-point optical communications, TDM broadcasting, or 5G or other network backhaul.

FIG. 1 illustrates a first example monostatic optical terminal 100 supporting multiple independent transmit and receive channels according to this disclosure. As shown in FIG. 1, the monostatic optical terminal 100 supports the use of multiple independent optical channels, which in this particular example includes two optical channels. The optical channels may be used by the monostatic optical terminal 100 for any suitable purpose(s), such as communication of information to and from two or more other optical terminals or other external devices or systems.

To support the use of multiple independent optical channels, the monostatic optical terminal 100 here includes multiple transmit channels 102*a*-102*b* and multiple receive channels 104*a*-104*b*. Each transmit channel 102*a*-102*b* is configured to receive an outgoing optical signal that will be transmitted from the monostatic optical terminal 100 via one of the multiple optical channels. In some cases, each outgoing optical signal encodes information that will be transmitted from the monostatic optical terminal 100. Each receive channel 104*a*-104*b* is configured to provide an incoming optical signal that has been received by the monostatic optical terminal 100 via one of the multiple optical channels. In some cases, each incoming optical signal encodes information that has been received by the monostatic optical terminal 100. Here, the transmit channel 102*a* and the receive channel 104*a* are associated with one optical channel, and the transmit channel 102*b* and the receive channel 104*b* are associated with another optical channel.

Each transmit channel 102*a*-102*b* includes any suitable structure configured to transport an outgoing optical signal, and each receive channel 104*a*-104*b* includes any suitable structure configured to transport an incoming optical signal. In some cases, each transmit channel 102*a*-102*b* and its associated receive channel 104*a*-104*b* can be implemented using a polarization-maintaining (PM) dual-clad optical fiber. Dual-clad optical fiber may be useful here since it can simplify the number of fiber coupling channels and reduce the number of optical components. For instance, each dual-clad optical fiber can allow an outgoing optical signal to be single mode in order to provide good beam quality and stable pointing, along with the potential for near diffraction-limited performance. Each dual-clad optical fiber can also provide a large multi-mode (MM) outer region for the collection of an incoming optical signal, which may be helpful when the incoming optical signal has wavefront distortion (such as from propagating through the atmosphere). Even without wavefront errors, coupling an incoming optical signal into the multi-mode region of a dual-clad optical fiber can achieve higher efficiencies compared to coupling into single-mode (SM) fiber.

In some embodiments, the transmit channels 102*a*-102*b* can transport outgoing optical signals having different polarizations, such as when the transmit channel 102*a* transports an outgoing optical signal having a linearly-polarized P polarization and the transmit channel 102*b* transports an outgoing optical signal having a linearly-polarized S polarization. Also, in some embodiments, the receive channels 104*a*-104*b* can transport incoming optical signals having different polarizations, such as when the receive channels 104*a*-104*b* transport incoming optical signals having P and S polarizations.

Multiplexer/demultiplexer units 106*a*-106*b* are coupled to the transmit channels 102*a*-102*b*, the receive channels 104*a*-104*b*, and dual-clad optical fibers 108*a*-108*b*. The multiplexer/demultiplexer unit 106*a* operates to allow optical signals for the transmit channel 102*a* and the receive channel 104*a* to be transported over the same dual-clad optical fiber 108*a*, such as over different portions of the dual-clad optical fiber 108*a*. Similarly, the multiplexer/demultiplexer unit 106*b* operates to allow optical signals for the transmit channel 102*b* and the receive channel 104*b* to be transported over the same dual-clad optical fiber 108*b*, such as over different portions of the dual-clad optical fiber 108*b*. Each multiplexer/demultiplexer unit 106*a*-106*b* includes any suitable structure configured to direct multiple optical signals to and from a common optical fiber. In some embodiments, each multiplexer/demultiplexer unit 106*a*-106*b* represents a polarization-maintaining/multi-mode optical multiplexer/demultiplexer. Each dual-clad optical fiber 108*a*-108*b* represents an optical fiber having multiple claddings.

In this example, the dual-clad optical fiber 108a is used to transport an outgoing optical signal 110a and an incoming optical signal 112a. The outgoing optical signal 110a represents the optical signal provided by the multiplexer/demultiplexer unit 106a based on the optical signal received over the transmit channel 102a, and the incoming optical signal 112a represents the optical signal provided to the multiplexer/demultiplexer unit 106a for transmission over the receive channel 104a. Similarly, the dual-clad optical fiber 108b is used to transport an outgoing optical signal 110b and an incoming optical signal 112b. The outgoing optical signal 110b represents the optical signal provided by the multiplexer/demultiplexer unit 106b based on the optical signal received over the transmit channel 102b, and the incoming optical signal 112b represents the optical signal provided to the multiplexer/demultiplexer unit 106b for transmission over the receive channel 104b.

The optical signals 110a-110b and 112a-112b can be polarized appropriately in order to reduce or avoid interference between the different optical channels supported by the monostatic optical terminal 100. For example, the outgoing optical signal 110a and the incoming optical signal 112a can have a linearly-polarized P polarization, and the outgoing optical signal 110b and the incoming optical signal 112b can have a linearly-polarized S polarization. A mirror or other reflector 114 here is used to reflect the outgoing optical signal 110b towards a polarization beam combiner/splitter 116 and to reflect the incoming optical signal 112b received from the polarization beam combiner/splitter 116. The reflector 114 represents any suitable structure configured to reflect optical energy at one or more appropriate wavelengths.

The polarization beam combiner/splitter 116 is configured to combine the outgoing optical signals 110a-110b having the different polarizations into a combined outgoing optical signal 118, which has both the P and S polarizations. The polarization beam combiner/splitter 116 is also configured to split a combined incoming optical signal 120, which has both the P and S polarizations, into the incoming optical signals 112a-112b having the different polarizations. The polarization beam combiner/splitter 116 includes any suitable structure configured to perform polarization-dependent optical signal combining and splitting.

The combined outgoing optical signal 118 may optionally pass through a quarter waveplate 122, which converts the linearly-polarized combined outgoing optical signal 118 into a circularly-polarized combined outgoing optical signal 124. For example, the quarter waveplate 122 can convert the P-polarized portion of the combined outgoing optical signal 118 to right-handed circular polarization and convert the S-polarized portion of the combined outgoing optical signal 118 to left-handed circular polarization. The circularly-polarized combined outgoing optical signal 124 passes through a shared aperture 126 and is transmitted as an output signal 128. The output signal 128 here contains both right-handed circularly-polarized and left-handed circularly-polarized portions. The optical energy of the output signal 128 may be received by multiple external devices or systems or otherwise used in any suitable manner.

In the opposite direction, an input signal 130 is received and may contain both right-handed circularly-polarized and left-handed circularly-polarized portions. The optical energy of the input signal 130 may be received from multiple external devices or systems or from other suitable sources of optical energy. The input signal 130 is received through the shared aperture 126 and may optionally be provided as a circularly-polarized combined incoming optical signal 132 to the quarter waveplate 122, which converts the circularly-polarized combined incoming optical signal 132 into the linearly-polarized combined incoming optical signal 120. For example, the quarter waveplate 122 can convert the right-handed circularly-polarized portion of the combined incoming optical signal 120 to P polarization and convert the left-handed circularly-polarized portion of the combined incoming optical signal 120 to S polarization. Note that the use of the circular polarization in the signals 128 and 130 here can help to make the monostatic optical terminal 100 insensitive to rotation relative to one or more external devices or systems.

The quarter waveplate 122 includes any suitable structure configured to convert linearly-polarized optical signals into circularly-polarized optical signals and vice versa. In some embodiments, for example, the quarter waveplate 122 may represent a plate or other planar structure formed from at least one birefringent material, where the structure is rotated about 45° relative to the axes defining the P and S polarizations. Note that while a quarter waveplate 122 is shown here, another suitable optical element may be used to convert between linear polarization and circular polarization. The shared aperture 126 represents any suitable structure through which both incoming and outgoing optical signals can pass.

As part of the overall control of the monostatic optical terminal 100, the monostatic optical terminal 100 in this example includes feedback loops formed using beam splitters 134a-134b, optical filters 136a-136b, position-sensitive detectors 138a-138b, and actuators 140a-140b. The beam splitter 134a is used here to split off a portion of the incoming optical signal 112a as a sample. The sample of the incoming optical signal 112a is filtered by the optical filter 136a. For example, the optical filter 136a can be used to pass one or more specified wavelengths of optical energy and block other wavelengths of optical energy. The resulting filtered sample of the optical filter 136a is provided to the position-sensitive detector 138a, which identifies a position of the sample or otherwise determines whether the sample is generally centered on the position-sensitive detector 138a. Output from the position-sensitive detector 138a is used to control the actuator 140a, which can be used to adjust the beam-pointing or aim of the incoming optical signal 112a. For instance, the actuator 140a may be used to physically move one end of the dual-clad optical fiber 108a in one or two directions (such as along orthogonal x and y axes) so that the incoming optical signal 112a is provided to a desired location of the dual-clad optical fiber 108a. Other types of actuators 140a may also be used here, such as one or more actuators that provide lens control, fast steering mirror (FSM) adjustment, or other optical steering control. However the actuator 140a is implemented, the actuator 140a is ideally used to help ensure that the incoming optical signal 112a is successfully recovered even if the optical energy in the incoming optical signal 112a for one optical channel varies in its position within the aperture 126. The beam splitter 134b, optical filter 136b, position-sensitive detector 138b, and actuator 140b may operate in the same or similar manner for the other optical channel.

Each beam splitter 134a-134b includes any suitable structure configured to sample an incoming optical signal, such as a standard beam splitter or a polarization beam splitter. Each optical filter 136a-136b includes any suitable structure configured to pass one or more wavelengths of optical energy and block other wavelengths of optical energy. In some embodiments, each optical filter 136a-136b can be tunable so that the optical filter 136a-136b is able to selectively pass different wavelengths of optical energy at different times. Each position-sensitive detector 138a-138b includes any suitable structure configured to measure the position of an optical signal, such as an optical quad-cell device having four cells (where measurements from the four cells are generally equal when an optical signal is centered at the point where the four cells of the position-sensitive detector 138a-138b meet). Each actuator 140a-140b includes any suitable structure configured to adjust the pointing or aim of an optical signal, whether through adjustment of a component receiving the optical signal, adjustment of the pointing or aiming direction of the optical signal, or other adjustment.

As can be seen here, each optical channel supported by the monostatic optical terminal 100 is associated with one of the beam splitters 134a-134b, one of the optical filters 136a-136b, one of the position-sensitive detectors 138a-138b, and one of the actuators 140a-140b. This allows the incoming optical signals 112a in the different optical channels to be separately sampled, which allows for independent control of the optical channels. Among other things, this allows the monostatic optical terminal 100 to engage in simultaneous or independent communications or other interactions with multiple external devices or systems in the monostatic optical terminal's field of view, such as by using different wavelengths to simultaneously or independently communicate or otherwise interact with different external devices or systems (thereby supporting WDM-based communications or other interactions). Moreover, when the optical filters 136a-136b are tunable, the wavelengths of the incoming optical signals 112a-112b can vary over time. Because of this, the monostatic optical terminal 100 can engage in communications or other interactions with different external devices or systems in the monostatic optical terminal's field of view at different times (thereby supporting TDM-based communications or other interactions). A combination of TDM- and WDM-based communications or other interactions may allow the monostatic optical terminal 100 to interact with an even larger number of external devices or systems. In this way, the monostatic optical terminal 100 may be able to function as a transceiver that supports simultaneous transmit/receive operations through the same aperture 126 with complete wavelength flexibility, support the use of multiple polarizations while still maintaining rotationally-insensitive performance and good channel-to-channel isolation, and operate multiple optical channels independently.

Note that simultaneous or independent communications or other interactions with two external devices or systems may occur in the example shown in FIG. 1 since there are two transmit and receive channels supported by the monostatic optical terminal 100. However, increasing the number of transmit and receive channels supported by the monostatic optical terminal 100 can increase the number of external devices or systems to and from which separate communications may occur at the same time.

In some embodiments, the beam splitters 134a-134b may represent standard beam splitters. However, one potential drawback with standard beam splitters is that they may sample the outgoing optical signals 110a-110b, which can decrease the overall strength of the output signal 128 but may be acceptable in these embodiments. In other embodiments, the beam splitters 134a-134b may be implemented as polarization beam splitters, and a polarization rotator 142 and a half waveplate 144 may be positioned optically between each beam splitter 134a-134b and the polarization beam combiner/splitter 116. Each polarization rotator 142 and its associated half waveplate 144 are collectively configured to rotate the polarization of an optical signal propagating in one direction and generally maintain the polarization of another optical signal propagating in the opposite direction. For example, each polarization rotator 142 may represent a Faraday rotator, and each half waveplate 144 may shift the polarization direction of a linearly-polarized signal by a specified amount. As a particular example of this arrangement, each half waveplate 144 may represent a plate or other planar structure formed from at least one birefringent material, where the structure is rotated about 2.5° relative to the axes defining the P and S polarizations (to provide a rotation of about 5°). Also, the thickness of each polarization rotator 142 may be chosen to provide an additional polarization rotation of about 5°. In one propagation direction, the change of polarization is the sum of the angles (about 10°). In the opposite propagation direction, the change of polarization is the difference of the angles (about) 0°. Thus, the outgoing optical signals 110a-110b may be substantially unattenuated by the polarization beam splitters 134a-134b, while the incoming optical signals 112a-112b can be effectively sampled by the polarization beam splitters 134a-134b. Additional details of this type of approach can be found in U.S. Provisional Patent Application No. 63/246, 648 filed on Sep. 21, 2021 (which is hereby incorporated by reference in its entirety).

FIG. 2 illustrates a second example monostatic optical terminal 200 supporting multiple independent transmit and receive channels according to this disclosure. Many of the components in FIG. 2 may be the same as or similar to corresponding components in FIG. 1. As a result, similar reference numerals are used in FIG. 2 to denote components that may be the same as or similar to the corresponding components of FIG. 1. For example, each component "2xx" in FIG. 2 may be the same as or similar to the corresponding component "1xx" in FIG. 1 unless noted below.

As shown in FIG. 2, the monostatic optical terminal 200 supports the use of multiple independent optical channels, which in this particular example includes two optical channels. The monostatic optical terminal 200 here includes multiple transmit channels 202a-202b and multiple receive channels 204a-204b. Each transmit channel 202a-202b is configured to receive an outgoing optical signal that will be transmitted from the monostatic optical terminal 200 via one of the multiple optical channels, and each receive channel 204a-204b is configured to provide an incoming optical signal that has been received by the monostatic optical terminal 200 via one of the multiple optical channels. In some cases, each outgoing optical signal and each incoming optical signal may encode information that will be transmitted from the monostatic optical terminal 200 or that has been received by the monostatic optical terminal 200. Each transmit channel 202a-202b and each receive channel 204a-204b includes any suitable structure configured to transport an outgoing or incoming optical signal, such as a standard optical fiber. Ends of the transmit channels 202a-202b and the receive channels 204a-204b can be held or maintained using at least one fiber coupling 246, which can be used to hold the ends of the transmit channels 202a-202b and the receive channels 204a-204b at desired locations. While a single fiber coupling 246 is shown here, separate fiber couplings 246 may be used for different transmit and receive channels.

In some embodiments, the transmit channels 202a-202b can transport outgoing optical signals having different polarizations, such as when the transmit channel 202a transports an outgoing optical signal 210a having a linearly-polarized P polarization and the transmit channel 202b transports an outgoing optical signal 210b having a linearly-polarized S polarization. Also, in some embodiments, the receive channels 204a-204b can transport incoming optical signals having different polarizations, such as when the receive channel 204a transports an incoming optical signal 212a having a linearly-polarized S polarization and the receive channel 204b transports an incoming optical signal 212b having a linearly-polarized P polarization. The optical signals 210a-210b and 212a-212b can therefore be polarized appropriately in order to reduce or avoid interference between the different optical channels supported by the monostatic optical terminal 200.

In this example, lenses 248 can be used to focus the outgoing optical signals 210a-210b exiting the transmit channels 202a-202b and to focus the incoming optical signals 212a-212b entering the receive channels 204a-204b. A polarization beam splitter 250a is used to enable the outgoing optical signal 210a and the incoming optical signal 212a to follow a common optical path, and a polarization beam splitter 250b is used to enable the outgoing optical signal 210b and the incoming optical signal 212b to follow a common optical path. In this example, this is accomplished by having the polarization beam splitters 250a-250b transmit the outgoing optical signals 210a-210b and reflect the incoming optical signals 212a-212b. Mirrors or other reflectors 252a-252b here are used to reflect the incoming optical signals 212a-212b towards the receive channels 204a-204b.

A mirror or other reflector 214 here is used to reflect the outgoing optical signal 210b towards a polarization beam combiner/splitter 216 and to reflect the incoming optical signal 212b received from the polarization beam combiner/splitter 216. The polarization beam combiner/splitter 216 is configured to combine the outgoing optical signals 210a-210b having the different polarizations into a combined outgoing optical signal 218, which has both the P and S polarizations. The polarization beam combiner/splitter 216 is also configured to split a combined incoming optical signal 220, which has both the P and S polarizations, into the incoming optical signals 212a-212b having the different polarizations.

The combined outgoing optical signal 218 may optionally pass through a quarter waveplate 222, which converts the linearly-polarized combined outgoing optical signal 218 into a circularly-polarized combined outgoing optical signal 224 (which has both left-handed circular polarization and right-handed circular polarization). The circularly-polarized combined outgoing optical signal 224 passes through a shared aperture 226 and is transmitted as an output signal 228. The output signal 228 here contains both right-handed circularly-polarized and left-handed circularly-polarized portions. In the opposite direction, an input signal 230 is received and may contain both right-handed circularly-polarized and left-handed circularly-polarized portions. The input signal 230 is received through the shared aperture 226 and may optionally be provided as a circularly-polarized combined incoming optical signal 232 to the quarter waveplate 222, which converts the circularly-polarized combined incoming optical signal 232 into the linearly-polarized combined incoming optical signal 220 (which has both P polarization and S polarization).

As part of the overall control of the monostatic optical terminal 200, the monostatic optical terminal 200 in this example includes a feedback loop formed using a beam splitter 234, an optical filter 236 (which may or may not be tunable), a position-sensitive detector 238, and an actuator 240. Depending on the implementation, each transmit channel 202a-202b and each receive channel 204a-204b may have its own instance of the feedback loop with these components 234-240, or subsets of the transmit channels 202a-202b and/or the receive channels 204a-204b may each have its own instance of the feedback loop with these components 234-240. These components 234-240 may operate in the same or similar manner described above with respect to FIG. 1 in order to sample an incoming or outgoing optical signal, filter the sample, sense the position of the filtered sample, and make adjustments based on the sensed position. Since different transmit and/or receive channels may be controlled independently, this approach offers the flexibility of a bi-static terminal but maintains the compact footprint of a monostatic design. The actuator or actuators 240 may use any suitable mechanism for controlling how the outgoing or incoming optical signals are directed or received, such as by moving one or more fiber couplings 246, providing lens control, performing free-space mirror adjustment, or using some other form of optical steering control.

As can be seen here, optical signals associated with different optical channels can be separately sampled, which allows for independent control of the optical channels. Among other things, this allows the monostatic optical terminal 200 to use different wavelengths to simultaneously or independently communicate or otherwise interact with different external devices or systems and support WDM-based communications or other interactions. Moreover, when the optical filters 236 are tunable, the monostatic optical terminal 200 can engage in communications or other interactions with different external devices or systems in the monostatic optical terminal's field of view at different times and support TDM-based communications or other interactions. A combination of TDM- and WDM-based communications or other interactions may allow the monostatic optical terminal 200 to interact with an even larger number of external devices or systems.

Again, the monostatic optical terminal 200 may be able to function as a transceiver that supports simultaneous transmit/receive operations through the same aperture 226 with complete wavelength flexibility, support the use of multiple polarizations while still maintaining rotationally-insensitive performance and good channel-to-channel isolation, and operate multiple optical channels independently. Note that simultaneous or independent communications or other interactions with two external devices or systems may occur in the example shown in FIG. 2 since there are two transmit and receive channels supported by the monostatic optical terminal 200. Increasing the number of transmit and receive channels supported by the monostatic optical terminal 200 can increase the number of external devices or systems to and from which separate communications may occur at the same time.

In this example, a polarization rotator 242 and a half waveplate 244 may be positioned optically between each of the polarization beam splitters 250a-250b and the polarization beam splitter/combiner 216. Each polarization rotator 242 and its associated half waveplate 244 are collectively configured to rotate the polarization of an optical signal propagating in one direction and generally maintain the polarization of another optical signal propagating in the opposite direction. As a particular example of this arrangement, each half waveplate 244 may represent a plate or other planar structure formed from at least one birefringent material, where the structure is rotated about 22.5° relative to the axes defining the P and S polarizations of the incoming light. Also, the thickness of each polarization rotator 242 may be chosen to provide an additional polarization rotation of about 45°. As a result, the polarization rotator 242 and the half waveplate 244 along the upper path in FIG. 2 can maintain the P polarization of the outgoing optical signal 210a and convert the P polarization of the incoming optical signal 212a into S polarization. The polarization rotator 242 and half waveplate 244 along the lower path in FIG. 2 can maintain the S polarization of the outgoing optical signal 210a and convert the S polarization of the incoming optical signal 212a into P polarization. Again, additional details of this type of approach can be found in U.S. Provisional Patent Application No. 63/246,648 (which has been incorporated by reference).

Overall, the designs of the monostatic optical terminals 100 and 200 shown in FIGS. 1 and 2 can provide a number of possible benefits or advantages depending on the implementation. For example, these designs increase the number of optical channels that can be used independently by the monostatic optical terminals 100 and 200, and this can be accomplished in compact packages and at reduced costs compared to other approaches. Also, these designs may suffer from little or no degradation compared to approaches that support sub-aperture techniques, which are techniques in which each optical channel is associated with optical energy passing through part of an aperture but not the entire aperture. Further, separate control of the optical channels may permit functions such as look-ahead or independent control, which may be useful in various applications such as those involving larger distances or larger relative velocities between devices or systems that are communicating with one another or those involving the monostatic optical terminal 100 or 200 acting as a relay or repeater between two other devices or systems. In addition, the use of features such as different wavelengths in different optical channels and tunable optical filters allows suitable TDM, WDM, or other multiplexing techniques to be used in order to enable interactions with any desired number of external devices or systems.

Although FIGS. 1 and 2 illustrate examples of monostatic optical terminals 100 and 200 supporting multiple independent transmit and receive channels, various changes may be made to FIGS. 1 and 2. For example, various components in FIGS. 1 and 2 may be combined, further subdivided, replicated, omitted, or rearranged and additional components may be added according to particular needs. Also, the sizes, shapes, and dimensions of the various components in FIGS. 1 and 2 can vary from the sizes, shapes, and dimensions shown here. Further, the monostatic optical terminal 100 uses an architecture based on dual-clad fiber, and the monostatic optical terminal 200 uses an architecture based on standard fiber. However, these approaches are not mutually exclusive, and hybrid approaches may be used that include both dual-clad fiber and standard fiber. Moreover, in general, the concepts described in this disclosure are not limited to the use of any specific type(s) of optical fiber(s). In addition, any suitable combination of features shown in FIGS. 1 and 2 may be used together in a single monostatic optical terminal, whether or not that specific combination of features is shown in FIGS. 1 and 2 or described above. Thus, for instance, the lenses 248 of FIG. 2 may be used with the dual-clad optical fibers 108a-108b of FIG. 1.

FIG. 3 illustrates an example system 300 using a monostatic optical terminal supporting multiple independent transmit and receive channels according to this disclosure. As shown in FIG. 3, the system 300 includes a controller 302 coupled to a monostatic optical terminal 304 by one or more optical fibers 306 and one or more electrical connections 308. The monostatic optical terminal 304 represents any suitable monostatic optical terminal supporting multiple independent transmit and receive channels, such as the monostatic optical terminal 100 or 200.

The controller 302 represents a component of the system 300 that can provide optical signals to the monostatic optical terminal 304 for transmission and/or that can receive optical signals obtained by the monostatic optical terminal 304. For example, the controller 302 may include one or more laser sources or other optical sources configured to generate outgoing optical signals that are provided to the monostatic optical terminal 304 for transmission, and the outgoing optical signals may encode information to be transmitted by the monostatic optical terminal 304. Also, the controller 302 may include one or more photodetectors or other sensors configured to receive incoming optical signals that are obtained by the monostatic optical terminal 304, and the incoming optical signals may encode information to be decoded by the controller 302. The controller 302 may perform any other or additional function(s) depending on the implementation.

The one or more electrical connections 308 may be used by the controller 302 to provide command and control signals to the monostatic optical terminal 304 or to receive feedback or other information from the monostatic optical terminal 304. For example, the one or more electrical connections 308 may be used by the controller 302 to control the wavelengths used by the monostatic optical terminal 304 for WDM-based operation and to control the tuning of optical filters in the monostatic optical terminal 304 for TDM-based operation. The one or more electrical connections 308 may be used by the controller 302 in any other suitable manner.

In this example, the monostatic optical terminal 304 is able to engage in optical communications or other interactions involving six external devices or systems, which here take the form of other monostatic optical terminals 310a-310f (although this is not required). The monostatic optical terminal 304 engages in WDM-based operation to enable the monostatic optical terminal 304 to simultaneously communicate with two of the monostatic optical terminals 310a-310f using different wavelengths at any given time. The monostatic optical terminal 304 also engages in TDM-based operation to enable the monostatic optical terminal 304 to simultaneously communicate with two different ones of the monostatic optical terminals 310a-310f during different time periods (which are denoted T1-T3 here). In this particular example, during the T1 time periods, the monostatic optical terminal 304 can use different wavelengths to simultaneously communicate with two of the monostatic optical terminals 310a-310b. During the T2 time periods, the monostatic optical terminal 304 can use different wavelengths to simultaneously communicate with two other of the monostatic optical terminals 310c-310d. During the T3 time periods, the monostatic optical terminal 304 can use different wavelengths to simultaneously communicate with yet two other of the monostatic optical terminals 310e-310f.

In this way, the monostatic optical terminal 304 is able to communicate or interact with multiple external devices or systems within its field of view. Using WDM, TDM, or other suitable multiplexing techniques, the monostatic optical terminal 304 may communicate or interact with a large number of external devices or systems. Also, using suitable beam-steering techniques or other suitable optical communication techniques, the monostatic optical terminal 304 can achieve relatively high data rates in its optical communications with the external devices or systems. For example, in some embodiments, the monostatic optical terminal 304 may allow for an overall data rate of about 10 gigabits per second, and the bulk of this data rate may be divided (evenly or unevenly) between communications with the monostatic optical terminals 310*a*-310*f*. Thus, for instance, if the monostatic optical terminal 304 is currently communicating with ten monostatic optical terminals 310*a*-310*f*, each monostatic optical terminal 310*a*-310*f* may be able to obtain a data rate of about 1 gigabit per second. The data rate can also vary depending on the number of external devices or systems engaging in communications or other interactions with the monostatic optical terminal 304.

Although FIG. 3 illustrates one example of a system 300 using a monostatic optical terminal 304 supporting multiple independent transmit and receive channels, various changes may be made to FIG. 3. For example, various components in FIG. 3 may be combined, further subdivided, replicated, omitted, or rearranged and additional components may be added according to particular needs. As a particular example, the controller 302 may be integrated into the monostatic optical terminal 304. Also, the monostatic optical terminal 304 may have any suitable field of view, and the monostatic optical terminal 304 may interact with any number of external devices or systems. In addition, while shown as supporting both TDM and WDM, the monostatic optical terminal 304 may support one of these multiplexing techniques.

The following describes example embodiments of this disclosure that implement or relate to monostatic optical terminals supporting multiple independent transmit and receive channels. However, other embodiments may be used in accordance with the teachings of this disclosure.

In a first embodiment, an apparatus includes a monostatic optical terminal configured to transmit and receive optical signals over multiple optical channels through an aperture. The monostatic optical terminal includes multiple transmit channels configured to provide outgoing optical signals for transmission by the monostatic optical terminal and multiple receive channels configured to receive incoming optical signals obtained by the monostatic optical terminal. The monostatic optical terminal also includes a polarization beam splitter/combiner configured to combine the outgoing optical signals into a combined outgoing optical signal and to split a combined incoming optical signal into the incoming optical signals. The monostatic optical terminal further includes at least one feedback loop configured to adjust an aim or path of at least one of the outgoing optical signals or at least one of the incoming optical signals.

In a second embodiment, a method includes providing outgoing optical signals for transmission by a monostatic optical terminal using multiple transmit channels and providing incoming optical signals obtained by the monostatic optical terminal to multiple receive channels. The method also includes using a polarization beam splitter/combiner to combine the outgoing optical signals into a combined outgoing optical signal and to split a combined incoming optical signal into the incoming optical signals. The method further includes using at least one feedback loop to adjust an aim or path of at least one of the outgoing optical signals or at least one of the incoming optical signals.

Any single one or any suitable combination of the following features may be used with the first or second embodiment. Each of the at least one feedback loop may include a beam splitter configured to split one of the outgoing optical signals or one of the incoming optical signals to generate a sample, an optical filter configured to filter the sample, a position-sensitive detector configured to sense a position of the filtered sample, and an actuator configured to adjust the aim or path of the one of the outgoing optical signals or the one of the incoming optical signals based on the sensed position. The optical filter may be tunable such that the monostatic optical terminal is configured to use different wavelengths for interactions over different ones of the optical channels. For each optical channel, a polarization rotator and a half waveplate may be collectively configured to adjust a polarization of the outgoing or incoming optical signal propagating in one direction in the optical channel and to maintain a polarization of another of the outgoing or incoming optical signal propagating in an opposite direction in the optical channel. An optical element may be configured to convert polarizations of the combined outgoing optical signal in order to generate an output signal and to convert polarizations of an input signal in order to generate the combined incoming optical signal. Different ones of the outgoing optical signals may have P and S polarizations, the polarization beam splitter/combiner may be configured to combine the outgoing optical signals into the combined outgoing optical signal having P and S polarizations, the optical element may include a quarter waveplate configured to convert P and S polarizations of the combined outgoing optical signal into left-handed circular polarization and right-handed circular polarization of the output signal, the quarter waveplate may be configured to convert left-handed circular polarization and right-handed circular polarization of the input signal into P and S polarizations of the combined incoming optical signal, and the polarization beam splitter/combiner may be configured to split the combined incoming optical signal into the incoming optical signals having P and S polarizations. The monostatic optical terminal may be configured to interact with multiple external devices or systems within the monostatic optical terminal's field of view simultaneously through the aperture using different wavelengths and/or interact with different external devices or systems within the monostatic optical terminal's field of view at different times. The monostatic optical terminal may be configured to control transmissions and receptions in different ones of the optical channels independently. Dual-clad optical fibers may be configured to transport the outgoing optical signals from the transmit channels and to transport the incoming optical signals to the receive channels, and optical multiplexers/demultiplexers may couple the transmit channels and the receive channels to the dual-clad optical fibers. The monostatic optical terminal may be configured to function as a link relay or a link repeater.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a monostatic optical terminal configured to transmit and receive optical signals over multiple optical channels through an aperture, the monostatic optical terminal comprising:
   multiple transmit channels configured to provide outgoing optical signals for transmission by the monostatic optical terminal and multiple receive channels configured to receive incoming optical signals obtained by the monostatic optical terminal;
   for each optical channel, a polarization rotator and a half waveplate collectively configured to adjust a polarization of the outgoing or incoming optical signal propagating in one direction in the optical channel and to maintain a polarization of another of the outgoing or incoming optical signal propagating in an opposite direction in the optical channel;
   a polarization beam splitter/combiner configured to combine the outgoing optical signals into a combined outgoing optical signal and to split a combined incoming optical signal into the incoming optical signals; and
   at least one feedback loop configured to adjust an aim or path of at least one of the outgoing optical signals or at least one of the incoming optical signals.

2. The apparatus of claim 1, wherein each of the at least one feedback loop comprises:
   a beam splitter configured to split one of the outgoing optical signals or one of the incoming optical signals to generate a sample;
   an optical filter configured to filter the sample;
   a position-sensitive detector configured to sense a position of the filtered sample; and
   an actuator configured to adjust the aim or path of the one of the outgoing optical signals or the one of the incoming optical signals based on the sensed position.

3. The apparatus of claim 2, wherein the optical filter is tunable such that the monostatic optical terminal is configured to use different wavelengths for interactions over different ones of the optical channels.

4. The apparatus of claim 1, wherein the polarization rotator for each optical channel comprises a Faraday rotator.

5. The apparatus of claim 1, further comprising:
   an optical element configured to convert polarizations of the combined outgoing optical signal in order to generate an output signal and to convert polarizations of an input signal in order to generate the combined incoming optical signal.

6. The apparatus of claim 5, wherein:
   different ones of the outgoing optical signals have P and S polarizations;
   the polarization beam splitter/combiner is configured to combine the outgoing optical signals into the combined outgoing optical signal having P and S polarizations;
   the optical element comprises a quarter waveplate configured to convert P and S polarizations of the combined outgoing optical signal into left-handed circular polarization and right-handed circular polarization of the output signal;
   the quarter waveplate is configured to convert left-handed circular polarization and right-handed circular polarization of the input signal into P and S polarizations of the combined incoming optical signal; and
   the polarization beam splitter/combiner is configured to split the combined incoming optical signal into the incoming optical signals having P and S polarizations.

7. The apparatus of claim 1, wherein the monostatic optical terminal is configured to at least one of:
   interact with multiple external devices or systems within the monostatic optical terminal's field of view simultaneously through the aperture using different wavelengths; and
   interact with different external devices or systems within the monostatic optical terminal's field of view at different times.

8. The apparatus of claim 1, wherein the monostatic optical terminal is configured to control transmissions and receptions in different ones of the optical channels independently.

9. The apparatus of claim 1, wherein the monostatic optical terminal further comprises:
   dual-clad optical fibers configured to transport the outgoing optical signals from the transmit channels and to transport the incoming optical signals to the receive channels; and
   optical multiplexers/demultiplexers coupling the transmit channels and the receive channels to the dual-clad optical fibers.

10. The apparatus of claim 1, wherein the monostatic optical terminal is configured to function as a link relay or a link repeater.

11. A method comprising:
    providing outgoing optical signals for transmission by a monostatic optical terminal using multiple transmit channels of multiple optical channels;
    providing incoming optical signals obtained by the monostatic optical terminal to multiple receive channels of the multiple optical channels;
    for each optical channel, using a polarization rotator and a half waveplate to adjust a polarization of the outgoing or incoming optical signal propagating in one direction in the optical channel and to maintain a polarization of another of the outgoing or incoming optical signal propagating in an opposite direction in the optical channel;
    using a polarization beam splitter/combiner to combine the outgoing optical signals into a combined outgoing optical signal and to split a combined incoming optical signal into the incoming optical signals; and
    using at least one feedback loop to adjust an aim or path of at least one of the outgoing optical signals or at least one of the incoming optical signals.

12. The method of claim 11, wherein each of the at least one feedback loop comprises:
- a beam splitter that splits one of the outgoing optical signals or one of the incoming optical signals to generate a sample;
- an optical filter that filters the sample;
- a position-sensitive detector that senses a position of the filtered sample; and
- an actuator that adjusts the aim or path of the one of the outgoing optical signals or the one of the incoming optical signals based on the sensed position.

13. The method of claim 12, wherein the optical filter is tunable such that the monostatic optical terminal uses different wavelengths for interactions over different ones of the optical channels.

14. The method of claim 11, wherein the polarization rotator for each optical channel comprises a Faraday rotator.

15. The method of claim 11, further comprising:
- using an optical element to convert polarizations of the combined outgoing optical signal in order to generate an output signal and to convert polarizations of an input signal in order to generate the combined incoming optical signal.

16. The method of claim 15, wherein:
- different ones of the outgoing optical signals have P and S polarizations;
- the polarization beam splitter/combiner combines the outgoing optical signals into the combined outgoing optical signal having P and S polarizations;
- the optical element comprises a quarter waveplate that converts P and S polarizations of the combined outgoing optical signal into left-handed circular polarization and right-handed circular polarization of the output signal;
- the quarter waveplate converts left-handed circular polarization and right-handed circular polarization of the input signal into P and S polarizations of the combined incoming optical signal; and
- the polarization beam splitter/combiner splits the combined incoming optical signal into the incoming optical signals having P and S polarizations.

17. The method of claim 11, wherein the monostatic optical terminal at least one of:
- interacts with multiple external devices or systems within the monostatic optical terminal's field of view simultaneously through an aperture using different wavelengths; and
- interacts with different external devices or systems within the monostatic optical terminal's field of view at different times.

18. The method of claim 11, wherein the monostatic optical terminal controls transmissions and receptions in different ones of the optical channels independently.

19. The method of claim 11, further comprising:
- using dual-clad optical fibers to transport the outgoing optical signals from the transmit channels and to transport the incoming optical signals to the receive channels; and
- using optical multiplexers/demultiplexers to couple the transmit channels and the receive channels to the dual-clad optical fibers.

20. The method of claim 11, wherein the monostatic optical terminal functions as a link relay or a link repeater.

\* \* \* \* \*